(12) United States Patent
Li et al.

(10) Patent No.: US 8,730,841 B2
(45) Date of Patent: May 20, 2014

(54) PEER TO PEER COMMUNICATIONS METHODS AND APPARATUS PROVIDING FOR USE OF BOTH WAN UPLINK AND DOWNLINK BANDS

(75) Inventors: Junyi Li, Bedminster, NJ (US); Rajiv Laroia, Far Hills, NJ (US); Xinzhou Wu, Monmouth Junction, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 939 days.

(21) Appl. No.: 12/111,717

(22) Filed: Apr. 29, 2008

(65) Prior Publication Data

US 2009/0010185 A1    Jan. 8, 2009

Related U.S. Application Data

(63) Continuation-in-part of application No. 11/774,498, filed on Jul. 6, 2007.

(51) Int. Cl.
H04J 3/00        (2006.01)

(52) U.S. Cl.
USPC .......................... 370/255; 370/280; 370/310

(58) Field of Classification Search
None
See application file for complete search history.

(56) References Cited

U.S. PATENT DOCUMENTS

| | | | |
|---|---|---|---|
| 7,336,638 B2 * | 2/2008 | Cheng et al. | 370/338 |
| 7,539,507 B2 * | 5/2009 | Grob et al. | 455/522 |
| 7,548,758 B2 * | 6/2009 | Periyalwar et al. | 455/517 |
| 2003/0126492 A1 | 7/2003 | Cavin | |
| 2005/0083856 A1 | 4/2005 | Morelli et al. | |
| 2005/0111383 A1 | 5/2005 | Grob et al. | |
| 2005/0143119 A1 | 6/2005 | Chandra et al. | |
| 2006/0168343 A1 | 7/2006 | Ma et al. | |
| 2006/0245398 A1 | 11/2006 | Li et al. | |
| 2007/0030156 A1 | 2/2007 | Schlager et al. | |
| 2007/0149238 A1 | 6/2007 | Das et al. | |
| 2008/0069033 A1 | 3/2008 | Li et al. | |
| 2008/0069039 A1 | 3/2008 | Li et al. | |
| 2009/0010186 A1 | 1/2009 | Li et al. | |

FOREIGN PATENT DOCUMENTS

| | | |
|---|---|---|
| CN | 1536925 A | 10/2004 |
| CN | 1549612 A | 11/2004 |
| CN | 1757257 A | 4/2006 |
| CN | 1792048 A | 6/2006 |

(Continued)

OTHER PUBLICATIONS

International Search Report and Written Opinion—PCT/US2008/068437, International Searching Authority—European Patent Office, Dec. 10, 2008.

(Continued)

Primary Examiner — Yemane Mesfin
Assistant Examiner — Henry Baron
(74) Attorney, Agent, or Firm — Joseph B. Agusta

(57) ABSTRACT

Methods and apparatus for supporting peer to peer communications are described. A peer to peer communications device uses both wide area network (WAN) uplink and downlink communications air link resources for peer to peer signaling. During an uplink share mode of operation a peer to peer wireless terminal uses a wide area network uplink communications band to communicate peer to peer signals, and the peer to peer wireless terminal implements a first transmission power control function. During a downlink share mode of operation, the peer to peer wireless terminal uses a wide area network downlink communications band to communicate peer to peer signals, and the peer to peer wireless terminal implements a second transmission power control function. The second power control function is different from the first power control function.

51 Claims, 10 Drawing Sheets

(56) References Cited

FOREIGN PATENT DOCUMENTS

| | | |
|---|---|---|
| CN | 1906899 A | 1/2007 |
| JP | 2004533158 A | 10/2004 |
| JP | 2006501768 A | 1/2006 |
| JP | 2006520158 A | 8/2006 |
| JP | 2006523408 A | 10/2006 |
| JP | 2007512779 A | 5/2007 |
| JP | 2007517475 A | 6/2007 |
| JP | 2008510344 A | 4/2008 |
| JP | 2009527170 A | 7/2009 |
| JP | 2010504048 A | 2/2010 |
| WO | WO02054620 A1 | 7/2002 |
| WO | WO02082751 A2 | 10/2002 |
| WO | 2004032380 | 4/2004 |
| WO | 2004077920 A2 | 9/2004 |
| WO | WO2004091238 A1 | 10/2004 |
| WO | WO2005053253 | 6/2005 |
| WO | 2005065271 A2 | 7/2005 |
| WO | WO2006016331 A1 | 2/2006 |
| WO | WO2006064411 A2 | 6/2006 |
| WO | 2007093653 A1 | 8/2007 |
| WO | 2008034023 | 3/2008 |
| WO | WO2008034029 | 3/2008 |

OTHER PUBLICATIONS

International Search Report and Written Opinion—PCT/US2009/041833, International Searching Authority—European Patent Office, Aug. 11, 2009.

M. Naraghi-Pour et al.: "Peer-to-Peer Communication in Wireless Local Area Networks" Proceedings of the International Conference on Computer Communications and Networks, Oct. 12, 1998-Oct. 15, 1998, pp. 432-439, XP002539139, Lafayette, USA, p. 433.

Taiwan Search Report—TW098114066—TIPO—Feb. 20, 2013.

Janis, P., et al., "Interference-aware resource allocation for device-to-device radio underlaying cellular networks", Vehicular Technology Conference, VTC Spring 2009. IEEE 69th, Apr. 2009, pp. 1-5.

\* cited by examiner

| FIGURE 4A |
| FIGURE 4A |
| FIGURE 4C |

PEER TO PEER COMMUNICATIONS METHODS AND APPARATUS PROVIDING FOR USE OF BOTH WAN UPLINK AND DOWNLINK BANDS

CROSS-REFERENCE

This application is a continuation-in-part of U.S. application Ser. No. 11/774,498, filed Jul. 6, 2007, and entitled "METHODS AND APPARATUS RELATED TO INTERFERENCE MANAGEMENT WHEN SHARING DOWNLINK BANDWIDTH BETWEEN WIDE AREA NETWORK USAGE AND PEER TO PEER SIGNALING," the entirety of which is incorporated herein by reference.

FIELD

Various embodiments are directed to methods and apparatus for wireless communication and, more particularly, to methods and apparatus for use in peer to peer wireless communication.

BACKGROUND

Wide area network (WAN) communications systems are typically allocated a set of uplink air link resources and a set of downlink air link resources for use. At times some of those resources are less than fully utilized.

Reception and recovery of downlink WAN signaling by a WAN wireless terminal may be affected by other types of signaling, e.g., peer to peer signaling, occurring concurrently using the same downlink WAN air link resources. Reception and recovery of uplink WAN signaling by a WAN base station may be affected by other types of signaling, e.g., peer to peer signaling, occurring concurrently using the same uplink WAN air link resources. It should be appreciated that a peer to peer communications device which transmits peer to peer signaling at a given power level using WAN air link resources will tend to have a different impact on base station signaling recovery operations than on wireless terminal WAN signaling recovery operations. The difference in impact on the WAN wireless terminal and the WAN base station may be a function of various factors such as the peer to peer device's current proximity to the base station, proximity to the WAN wireless terminal, the transmission power levels of the various WAN signals and the channel condition between the WAN base station and WAN wireless terminal.

It would be advantageous if methods and apparatus were developed which permitted for WAN uplink and downlink air link resources to be shared to support other communications techniques, e.g., peer to peer signaling. It would be advantageous if some such methods and apparatus allowed a peer to peer wireless terminal to share uplink, downlink and/or both uplink and downlink WAN air link resources with WAN devices. In a time division duplex WAN system, methods and apparatus that allow a peer to peer device to continue peer to peer operations during both uplink and downlink WAN time slots would be beneficial. In a frequency division duplex WAN system, methods and apparatus that allow a peer to peer device to select and switch between uplink and downlink frequency bands to use at a given time would be beneficial. It would be advantageous if, in some but not necessarily all embodiments, peer to peer wireless terminal methods and apparatus could be developed which use different power control functions depending upon whether the peer to peer communications share uplink or downlink WAN air link resources.

SUMMARY

Methods and apparatus for supporting peer to peer communications are described. In some but not necessarily all embodiments, a peer to peer communications device uses both wide area network (WAN) uplink and downlink communications air link resources for peer to peer signaling. In one exemplary embodiment, during an uplink share mode of operation a peer to peer wireless terminal uses a wide area network uplink communications band to communicate peer to peer signals, and the peer to peer wireless terminal implements a first transmission power control function. During a downlink share mode of operation, the peer to peer wireless terminal uses a wide area network downlink communications band to communicate peer to peer signals, and the peer to peer wireless terminal implements a second transmission power control function. The second power control function is different from the first power control function. In various embodiments, the peer to peer communications device stores and maintains first and second sets of power control information corresponding to first and second power control functions.

In some embodiments in which the WAN uses time division duplex (TDD), the peer to peer wireless terminal is controlled to switch between uplink and downlink share modes operation according to a TDD schedule. In some embodiments, in which the WAN uses frequency division duplex (FDD), the peer to peer wireless terminals is controlled to switch between uplink and downlink share modes as a function of at least one of: transmission power control cap information for transmitting peer to peer signals into a WAN uplink communication band, transmission power control cap information for transmitting into a downlink WAN communications band, a comparison of uplink and downlink transmission power cap information, and peer to peer air link resources needs.

An exemplary method of operating a peer to peer communications device to use both a wide area network uplink communications band and a wide area network downlink communications band comprises: during an uplink share mode of operation implementing a first transmission power control function; and during a downlink share mode of operation implementing a second transmission power control function which is different from said first transmission power control function. In various embodiments, the method further comprises: transmitting a peer to peer signal during said uplink share mode of operation using a transmission power level determined according to said first transmission power control function into said wide area network uplink communications band; and transmitting a peer to peer signal during said downlink share mode of operation using a transmission power level determined according to said second transmission power control function into said wide area network downlink band. An exemplary wireless terminal that supports use of both a wide area network uplink communications band and a wide area network down link communications band, in accordance with various embodiments comprises: an uplink share mode power control module for implementing a first transmission power control function during an uplink share mode of operation; and a downlink share mode power control module for implementing a second transmission power control function which is different from said first transmission power control function during a downlink share mode of operation.

While various embodiments have been discussed in the summary above, it should be appreciated that not necessarily all embodiments include the same features and some of the features described above are not necessary but can be desirable in some embodiments. Numerous additional features, embodiments and benefits are discussed in the detailed description which follows.

DETAILED DESCRIPTION

Figure 1:
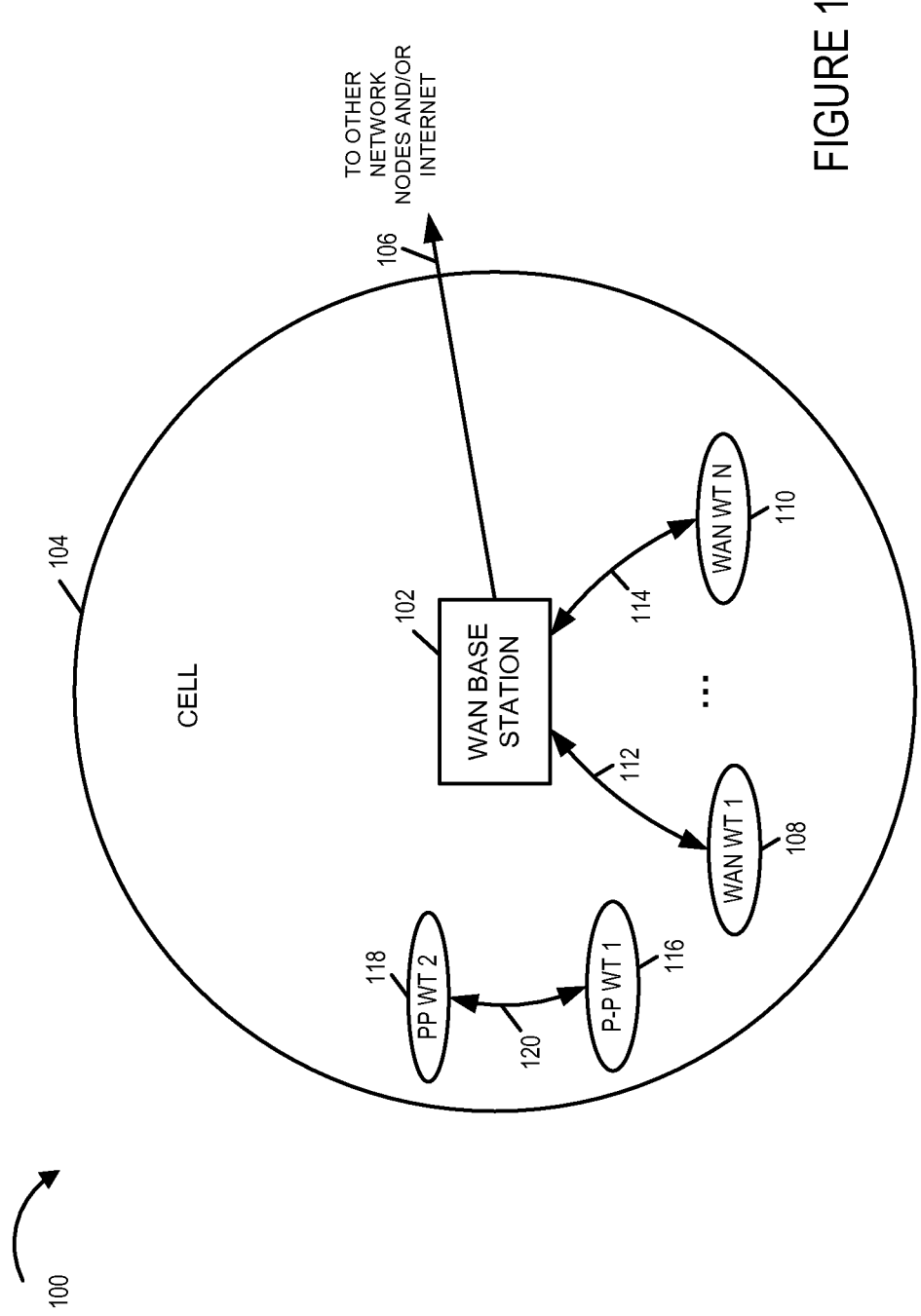
FIG. 1 is a drawing of an exemplary wireless communications system 100 in which a peer to peer wireless communications device uses both wide area network uplink and downlink communications bands for peer to peer signaling, in accordance with various embodiments.

FIG. 1 is a drawing of an exemplary wireless communications system 100 in which a peer to peer wireless communications device uses both wide area network uplink and downlink communications bands for peer to peer signaling, in accordance with various embodiments. The wide area network is, in some embodiments, a time division duplex (TDD) system. In some other embodiments, the wide area network is a frequency division duplex (FDD) system. In still other embodiments, the wide area network uses TDD techniques in portions of the system and FDD techniques in other portions of the system for WAN signaling.

Exemplary wireless communications system 100 includes a WAN base station 102 which is coupled to other network nodes, e.g., other base stations, routers, home agent nodes, system control nodes, AAA nodes, etc., and/or the Internet via network link 106. Network link 106 is, e.g., a fiber optic link. Cell 104 represents a wireless coverage area for WAN base station 102. The base station 102 uses a WAN uplink communications band and a WAN downlink communications band.

Exemplary communications system 100 also includes a plurality of WAN wireless terminals (WAN WT 1 108, . . . , WAN WT N 110). At least some of the WAN WTs are mobile nodes which may move throughout the communications system 100 and couple to a base station, e.g., using the base station as a point of network attachment. WAN WTs (108, 110) are currently coupled to WAN base station 102 via wireless links (112, 114), respectively.

In exemplary system 100 there are also a plurality of peer to peer wireless terminals including peer to peer wireless terminal 1 116 and peer to peer wireless terminal 2 118. Currently, the peer to peer wireless terminals (116, 118) are located in cell 104, are communicating with each other via peer to peer communications link 120 and are using both the uplink and downlink WAN communications bands of base station 102 for peer to peer signaling. The peer to peer wireless terminals (116, 118) use different power control functions regarding peer to peer transmission into the uplink and downlink WAN communications bands. Peer to peer signals in the downlink communications band are interference from the perspective of the WAN WTs (108, 110) attempting to recover information being communicated in downlink signals from base station 102. Peer to peer signals in the uplink communications band are interference from the perspective of the WAN base station 102 attempting to recover information being communicated in uplink signals from WAN wireless terminals (108, 110).

Figure 2:
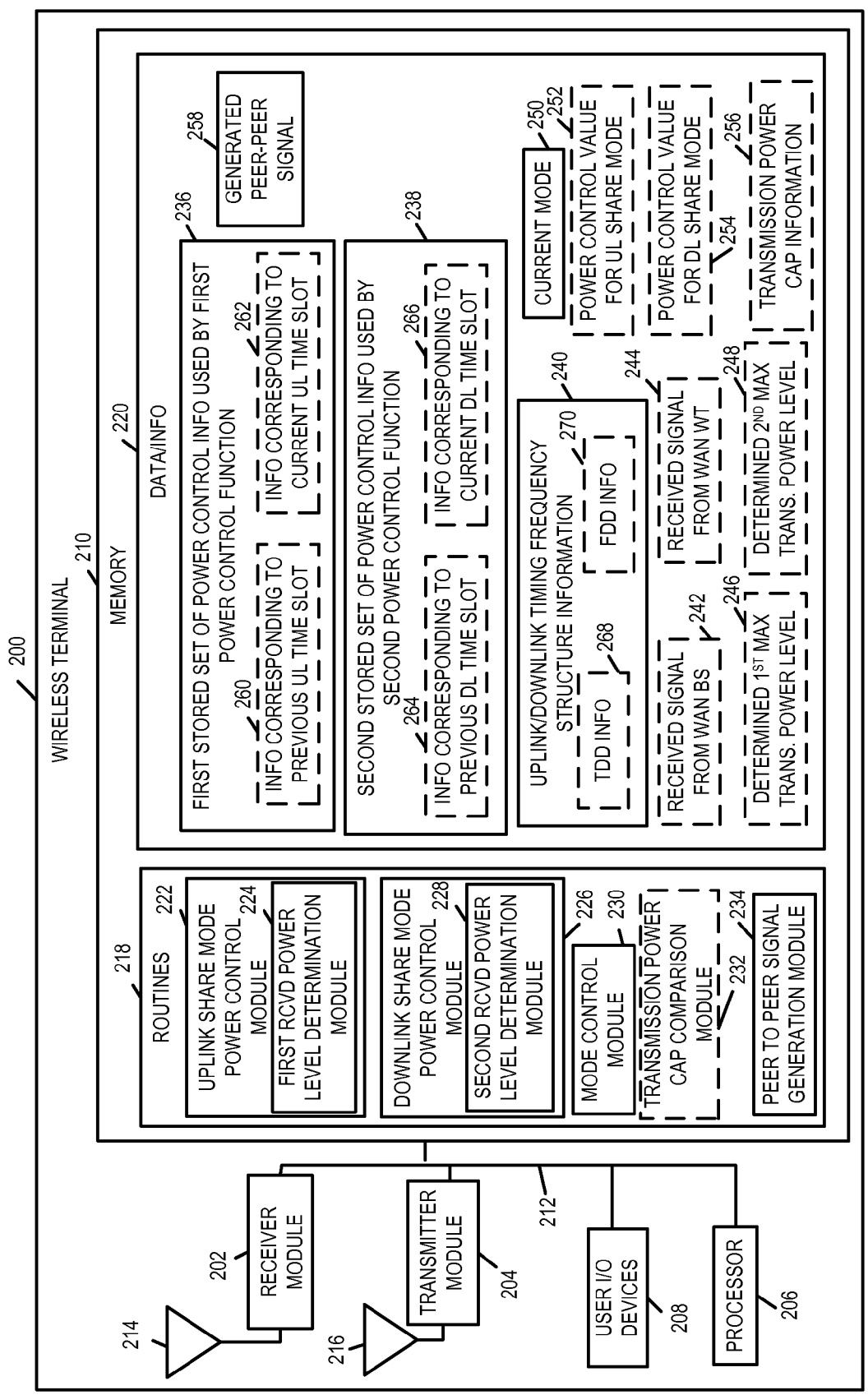
FIG. 2 is a drawing of an exemplary wireless terminal, e.g., mobile node supporting peer to peer communications in both a WAN uplink communications band and a WAN downlink communications band, in accordance with various embodiments.

FIG. 2 is a drawing of an exemplary wireless terminal 200, e.g., mobile node supporting peer to peer communications in both a WAN uplink communications band and a WAN downlink communications band, in accordance with various embodiments. Exemplary wireless terminal 200 is, e.g., one of peer to peer wireless terminals 116, 118 of FIG. 1. In some embodiments, the wide area network is a TDD wide area network. In some such embodiments, a WAN uplink communications band includes an uplink time slot of the TDD wide area network and a WAN downlink communications band includes a downlink time slot of the TDD wide area network. In some other embodiments, the wide area network is a FDD wide area network and a WAN uplink band is a different frequency band from a WAN downlink frequency band. In some embodiments, the wide area network includes portions which use TDD and portions which use FDD.

Exemplary wireless terminal 200 includes a receiver module 202, a transmitter module 204, user I/O devices 208, a processor 206, and memory 210 coupled together via a bus 212 over which the various elements may exchange data and information.

Receiver module 202, e.g., an OFDM or CDMA receiver, is coupled to receive antenna 214 via which the wireless terminal 200 receives signals. Received signals include peer to peer signals from other peer to peer wireless terminals, e.g., as part of a peer to peer communications session. Received signals also include a reference or control information signal from a wide area network base station used by wireless terminal 200 in performing peer to peer transmission power control regarding peer to peer transmission into an uplink WAN band, e.g., received signal from WAN BS 242. Received signals also include a reference or control information signal from a wide area network wireless terminal used by wireless terminal 200 in performing peer to peer transmission power control regarding peer to peer transmission into a downlink WAN band, e.g., received signal from WAN WT 244.

Transmitter module 204, e.g., an OFDM or CDMA, is coupled to transmit antenna 216 via which the wireless terminal transmits signals. Transmitted signals include peer to peer signals in a WAN uplink band and peer to peer signals in a WAN downlink band. Transmitter module 204 is responsive to the uplink share mode power control module 222 during an uplink share mode of operation and responsive to the downlink share power control module 226 during a downlink share mode of operation, said transmitter transmitting a peer to peer signal into a wide area network uplink communications band during the uplink share mode of operation using a transmission power level determined according to the first power control function and transmitting a peer to peer signal into a wide area network downlink band during a downlink share mode of operation using a transmission power level determined according to the second transmission power control function.

User I/O devices 208 include, e.g., microphone, keyboard, keypad, mouse, camera, switches, speaker, display, etc. User I/O devices 208 allow a user of wireless terminal 200 to input data/information, access output data/information and control at least some functions of the wireless terminal 200, e.g., initiate a peer to peer communications session.

Memory 210 includes routines 218 and data/information 220. The processor 206, e.g., a CPU, executes the routines 218 and uses the data/information 220 in memory 210 to control the operation of the wireless terminal 200 and implement methods, e.g. the methods of flowchart 300 of FIG. 3, flowchart 400 of FIG. 4, or flowchart 500 of FIG. 5.

Routines 218 include an uplink share mode power control module 222, a downlink share mode power control module 226, a mode control module 230, and a peer to peer signal generation module 234. In some embodiments, e.g., some embodiments supporting peer to peer communications in using TDD WAN bands, routines 218 includes a transmission power cap comparison module 232.

Data/information 220 includes a first stored set of power control information used by the first power control function 236, a second set of stored power control information used by the second power control function 238, uplink/downlink timing frequency structure information 240, a current mode 250 and a generated peer to peer signal 258. Data information 220 may, and sometimes does include one or more of received signals from WAN base station 242, received signals from WAN wireless terminal 244, a determined $1^{st}$ maximum transmission power level 246, a determined $2^{nd}$ maximum transmission power level 248, a power control value for an uplink share mode 252, a power control value for a downlink share mode 254, and transmission power cap information 256.

Uplink share mode power control module 222 implements a first transmission power control function during an uplink share mode of operation. In various embodiments, at times the uplink share mode control module 222 uses a stored value corresponding to a previous uplink time slot, e.g. an immediately preceding uplink time slot in determining transmission power for a current uplink time slot. In some embodiments, the immediately preceding uplink time slot and the current uplink time slot are separated by a downlink time slot.

In some embodiments, the uplink share mode power control module 222 implements the first transmission power control function by i) generating a first value for a signal received from a WAN base stations and ii) using the generated first value to control transmission power during the uplink mode of operation. The generated first value is, e.g., power control value for uplink share mode 252.

Uplink share mode power control module 222 includes a first received power level determination module 224. The first received power level determination module 224 determines from a received signal, e.g., a received signal from a WAN base station, a first maximum transmission power level 246, e.g., a maximum permitted peer to peer transmission power level when transmitting using a WAN uplink communications band.

Downlink share mode power control module 226 implements a second transmission power control function which is different than the first transmission power control function during a downlink share mode of operation. In various embodiments, at times the downlink share mode power control module 226 uses a stored value corresponding to a previous downlink time slot, e.g. an immediately preceding downlink time slot in determining transmission power for a current downlink time slot. In some embodiments, the immediately preceding downlink time slot and the current downlink time slot are separated by an uplink time slot.

In some embodiments, the downlink share mode power control module 226 implements the second transmission power control function using a second value generated from a signal received from a WAN wireless terminal. The generated second value is, e.g., power control value for downlink share mode 254.

Downlink share mode power control module 226 includes a second received power level determination module 228. The second received power level determination module 228 determines from a received signal, e.g., a received signal from a WAN WT, a second maximum transmission power level 248, e.g., a maximum permitted peer to peer transmission power level when transmitting using a WAN downlink communications band.

In some embodiments, the first function of the uplink share mode power control module 222 uses a first maximum permitted transmission power level and the second function of the downlink share mode power control module 226 uses a second maximum permitted transmission power level to determine the transmission power level to be used during said uplink and downlink shared modes respectively.

Mode control module 230 in some embodiments controls switching between uplink and downlink share modes of operation according to a time division multiplexing schedule used by a wide area network. In various embodiments, the mode control module 230 controls switching between use of the first set of stored power control information 236 and the second set of stored power control information 238 depending on the mode of operation, e.g., depending on the mode indicated by current mode 250. In some embodiments, e.g., some embodiments sharing air link resources of a WAN FDD system, the mode control module 230 controls switching between uplink and downlink share modes of operation based on a transmission power control cap applicable to transmissions into one of a WAN uplink frequency band and a WAN downlink frequency band.

Peer to peer signal generation module 234 generates peer to peer signals, e.g., generated peer to peer signal 258, to be transmitted by transmitter module 204 under the control of a power control module, e.g., uplink share mode power control module 222 or downlink share mode power control module 226.

Transmission power control cap comparison module 232 uses the data/information 220 including transmission power cap information 256 to determine if a transmission power control cap of a current mode of operation is less than a current transmission power requirement. In some embodiments including the transmission power cap comparison module 232, the mode control module 230 controls switching to the one of the uplink and downlink share modes which has a higher transmission power control cap when the transmission power control cap of the current mode of operation is insufficient to meet transmission requirements.

The first stored set of power control information 236 is used by the first power control function of the uplink share mode power control module 222. First stored set of power control information used by first power control function 236, in some embodiments, at times, includes information corresponding to a previous uplink time slot 260 and information corresponding to the current uplink time slot 262. Information corresponding to a previous uplink time slot 260 includes, e.g., a value used to control transmission in an immediately preceding time slot which precedes the current time slot.

Second stored set of power control information used by second power control function 238, in some embodiments, at times, includes information corresponding to a previous downlink time slot 264 and information corresponding to the current downlink time slot 266. The second set of stored power control information 238 is used by the second power control function of the downlink share mode power control module 226. The first and second stored sets of power control information (236,238) include at least some information which is different.

Uplink/downlink timing frequency structure information 240 includes one or more of time division duplex information 268 and frequency division duplex information 270. TDD information 268 includes information identifying a WAN uplink band for a TDD embodiment including information identifying frequencies and information identifying time slots for uplink as part of a TDD schedule. TDD information 268 also includes information identifying a WAN downlink band for a TDD embodiment including information identifying frequencies and information identifying time slots for downlink as part of a TDD schedule. The frequencies for the uplink and downlink bands may be, and sometimes are the same, while the time slots designated as part of the uplink band are non-overlapping with the time slots designated as part of the downlink band.

FDD information 270 includes information identifying a set of frequencies of a downlink band and a set of frequencies of an uplink band, the sets of frequencies being non-overlapping. In some embodiments, a set of frequencies for an uplink or downlink FDD band is contiguous. In some embodiments, a set of frequencies for an uplink or downlink band is non-contiguous.

Figure 3:
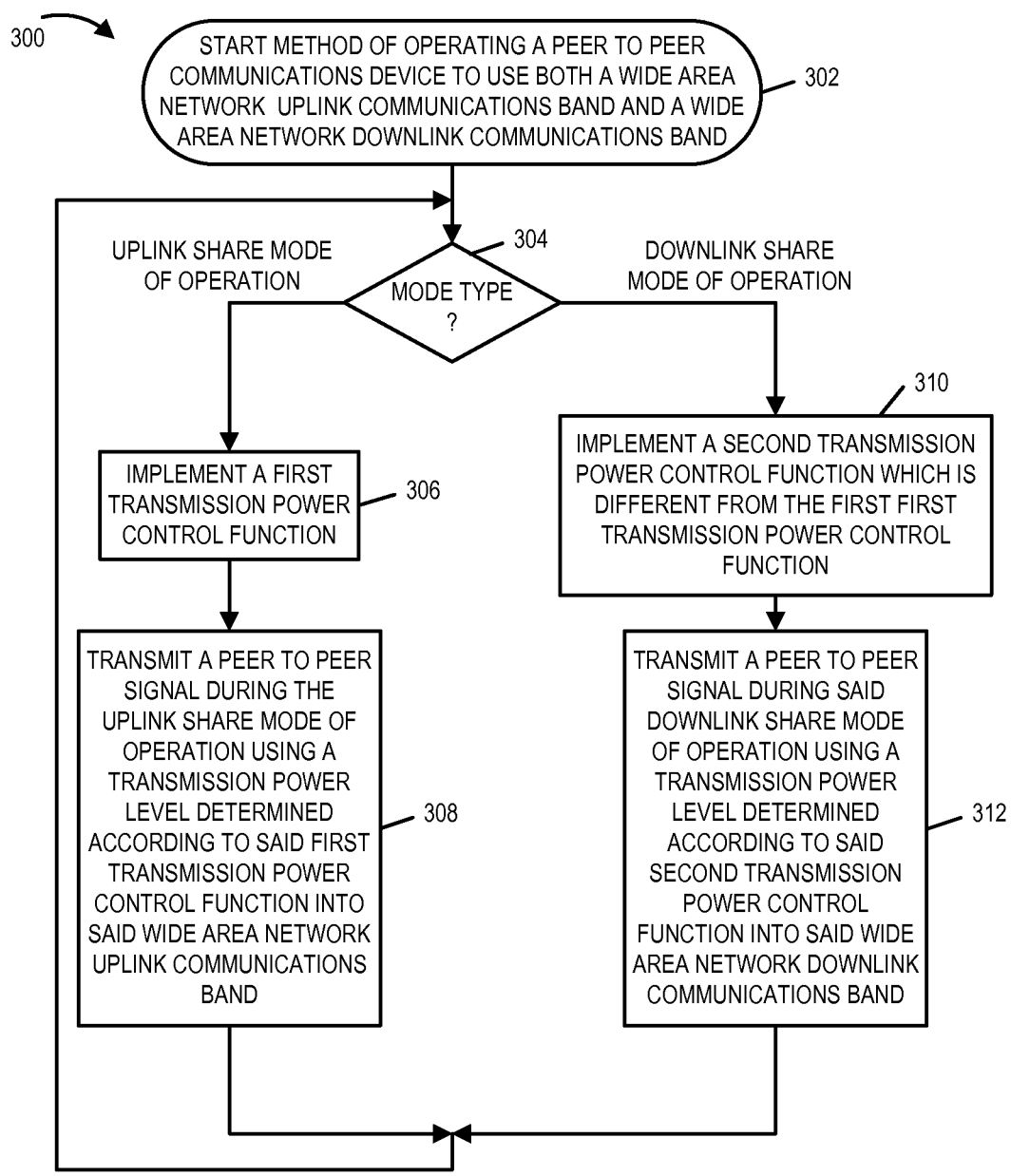
FIG. 3 is a flowchart of an exemplary method of operating a peer to peer communications device to use both a wide area network uplink communications band and a wide area network downlink communications band for peer to peer signaling in accordance with various embodiments.

FIG. 3 is a flowchart 300 of an exemplary method of operating a peer to peer communications device to use both a wide area network uplink communications band and a wide area network downlink communications band for peer to peer signaling in accordance with various embodiments. Operation starts in step 302, where the peer to peer communications device is powered on and initialized and proceeds to step 304. In step 304 the communications device determines a mode of operation and proceeds to different steps as a function of the determination. If the determined mode type is an uplink share mode of operation, operation proceeds from step 304 to step 306; however, if the determined mode is a downlink share mode of operation, operation proceeds from step 304 to step 310.

Returning to step 306, in step 306 the peer to peer communications device implements a first transmission power control function. Operation proceeds from step 306 to step 308. In step 308, the peer to peer communications device transmits a peer to peer signal during the uplink share mode of operation using a transmission power level determined according to the first transmission power control function into the wide area network uplink communications band.

Returning to step 310, in step 310, the peer to peer communications device implements a second transmission power control function which is different from the first transmission power control function. Operation proceeds form step 310 to step 312. In step 312, the peer to peer communications device transmits a peer to peer signal during a downlink share mode of operation using a transmission power level determined according to a second transmission power control function into said wide area network downlink communications band. Operation proceeds from step 308 or step 312 to step 304, where mode is again determined.

In some embodiments the wide area network is a time division duplex (TDD) wide area network. In some such embodiments, the uplink band includes an uplink time slot of the TDD wide area network and the downlink band includes a downlink time slot of the TDD wide area network.

In some other embodiments, the wide area network is a frequency division duplex (FDD) wide area network and the uplink frequency band is a different frequency band from the downlink frequency band.

In some other embodiments, the wide area network includes portions that are TDD and portions that are FDD.

Figures 4, 4A:
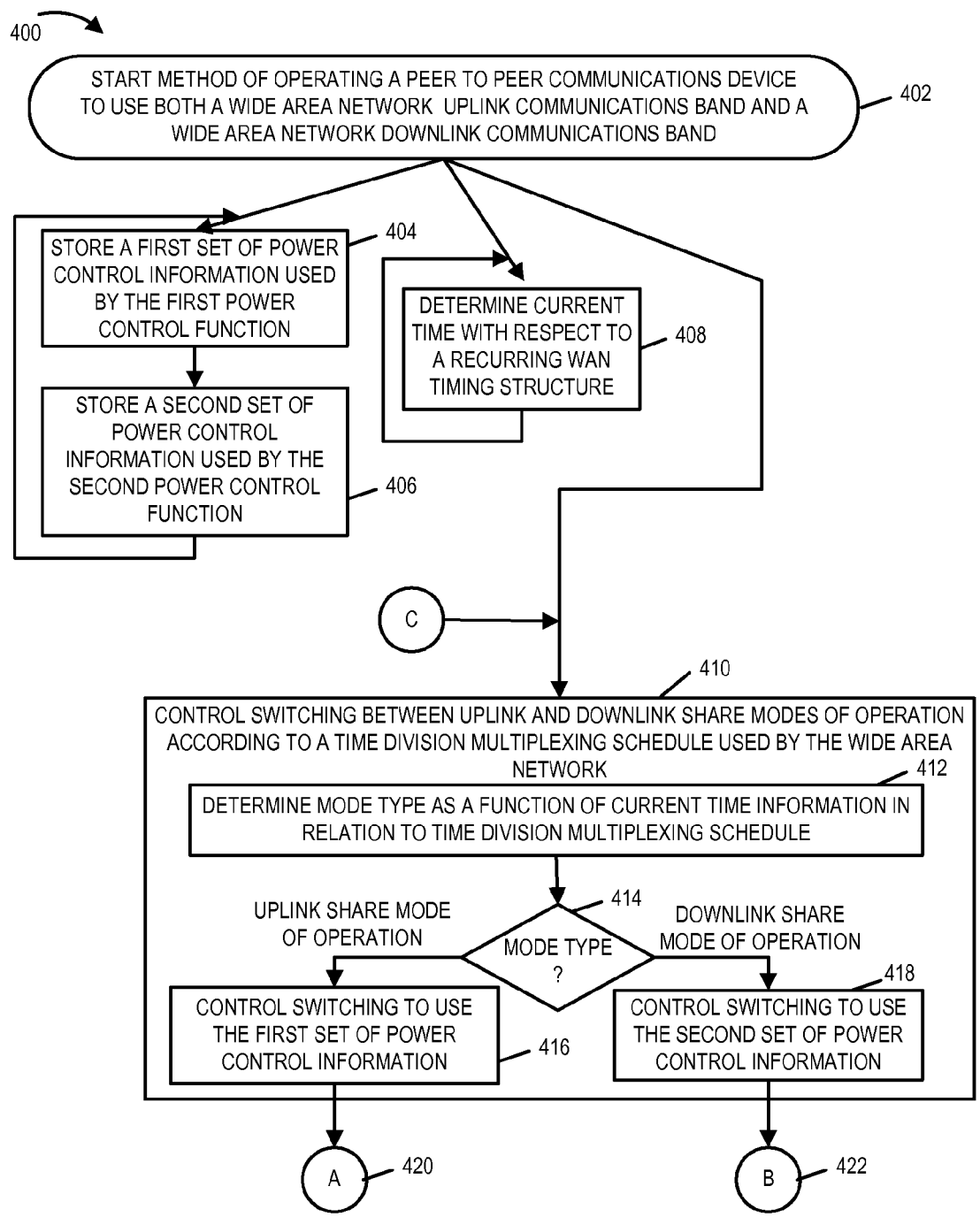
FIG. 4 comprising the combination of FIG. 4A, FIG. 4B
Figure 4B:
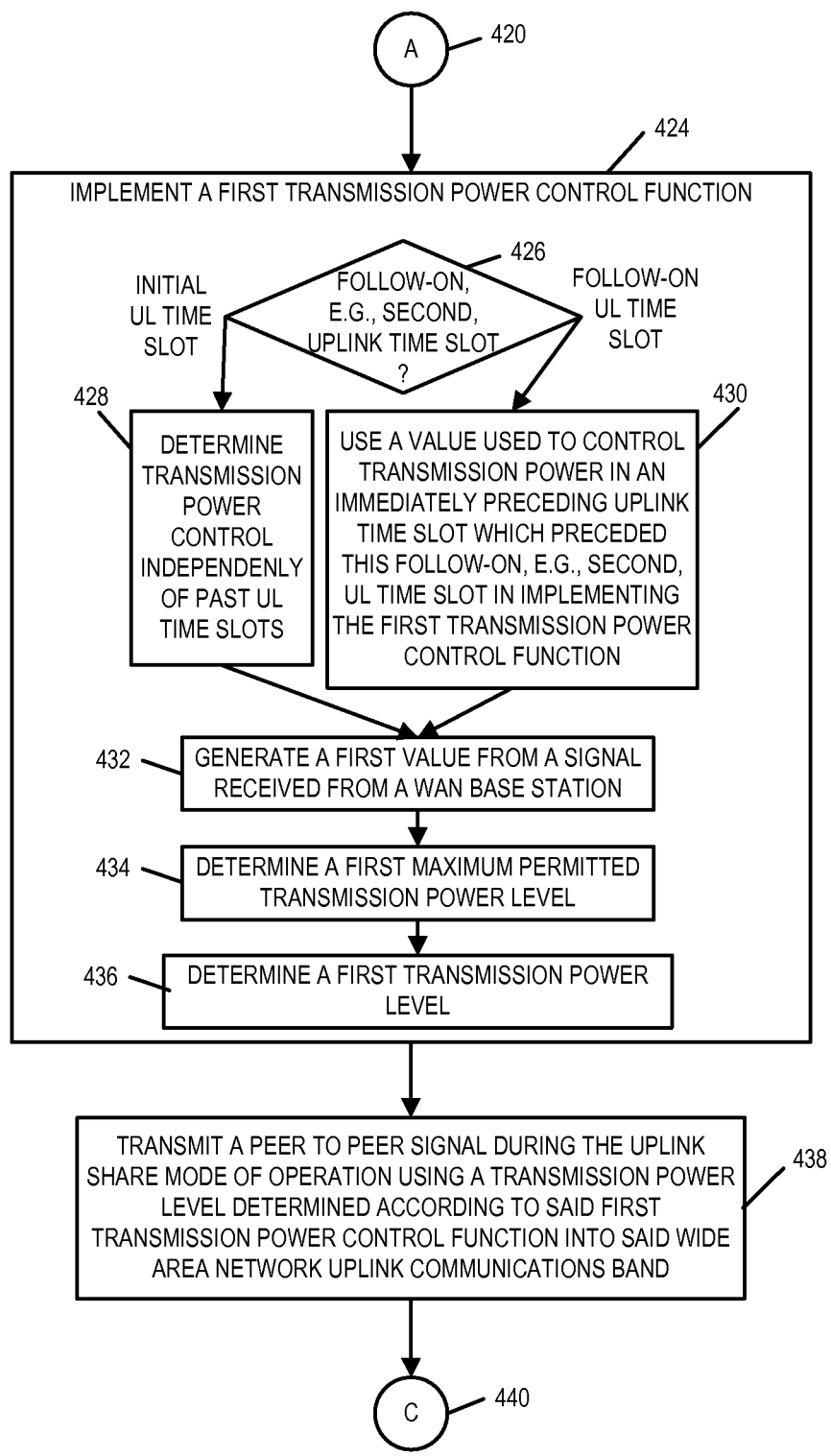
FIG. 4C is a flowchart of an exemplary method of operating a peer to peer communications device to use both a wide area network uplink communications band and a wide area network downlink communications band for peer to peer signaling in accordance with various embodiments.
Figure 4C:
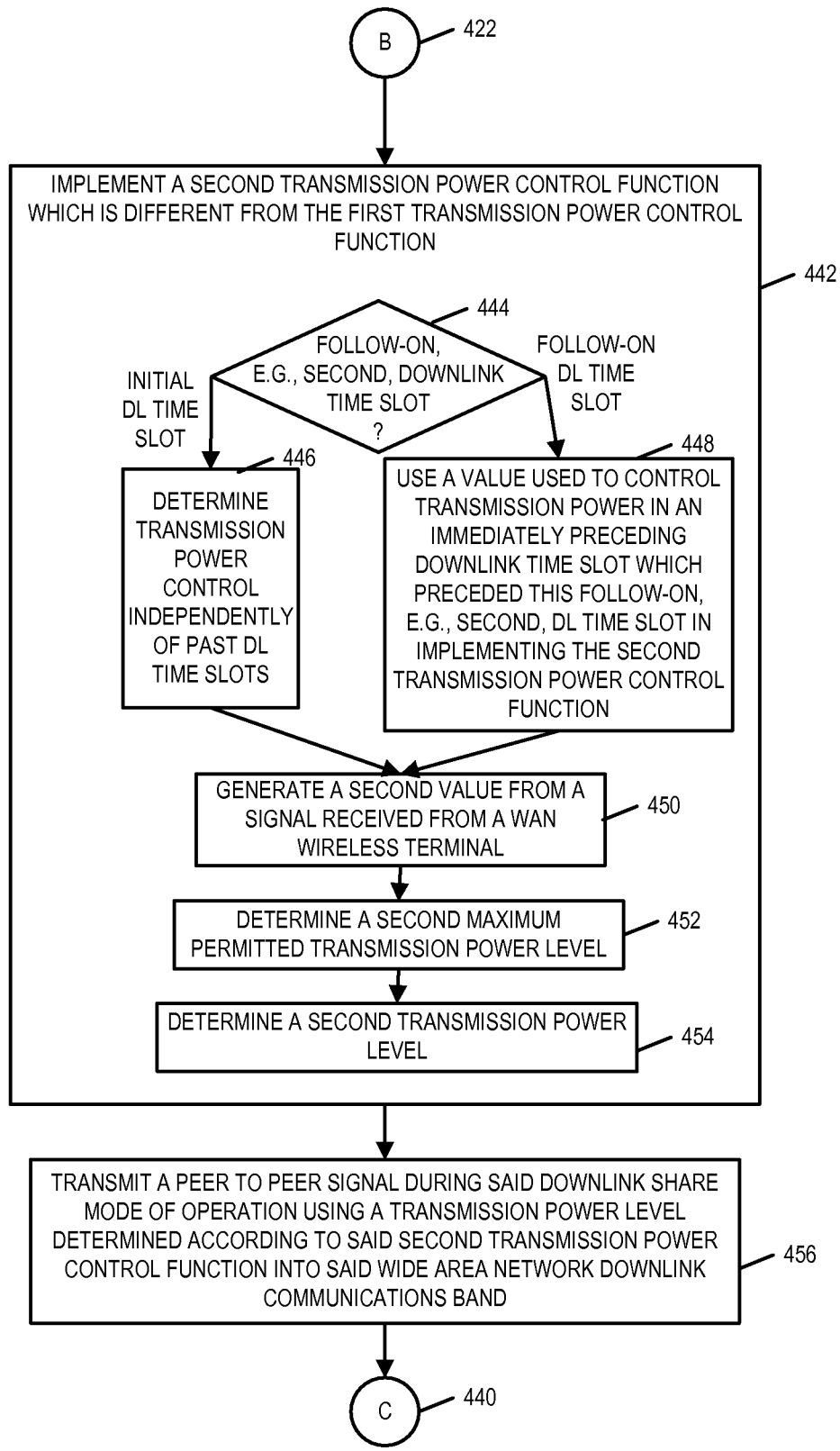

FIG. 4 comprising the combination of FIG. 4A, FIG. 4B and FIG. 4C is a flowchart 400 of an exemplary method of operating a peer to peer communications device to use both a wide area network uplink communications band and a wide area network downlink communications band for peer to peer signaling in accordance with various embodiments. In various embodiments, the wide area network is a TDD wide area network. In some such embodiments, the uplink communications band includes an uplink time slot of the TDD wide area network and the downlink communications band includes a downlink time slot of the TDD wide area network. Operation starts in step 402, where the peer to peer communications device is powered on and initialized and proceeds to steps 404, 408, and 410.

In step 404, the communications device stores a first set of power control information to be used by the first power control function. Operation proceeds from step 404 to step 406 in which the communications device stores a second set of power control information to be used by the second power control function. Operation proceeds from step 406 to step 404.

Returning to step 408, in step 408, which is performed on an ongoing basis, the peer to peer communications device determines current time with respect to a recurring wide area network timing structure.

Returning to step 410, in step 410, the peer to peer communications device controls switching between uplink and downlink share modes of operation according to a time division multiplexing schedule used by a wide area network. Step 410 includes sub-steps 412, 414, 416 and 418. In sub-step 412, the peer to peer communications device determines a mode type as a function of current time information in relation to a time division multiplexing schedule. Then, in sub-step 414, the peer to peer communications device proceeds differently depending on the determined mode type. If the mode type is determined to be an uplink share mode of operation, then operation proceeds from sub-step 414 to sub-step 416, in which the peer to peer communications device controls switching to use the first set of power control information. However, if the mode type is determined to be a downlink share mode of operation, then operation proceeds from sub-step 414 to sub-step 418 in which the peer to peer communications device controls switching to use the second set of power control information.

Returning to sub-step 416 operation proceeds from sub-step 416 via connecting node A 420 to step 424. In step 424, the peer to peer communications device implements a first transmission power control function. Step 424 includes sub-steps 426, 428, 430, 432, 434 and 436. In sub-step 426 the peer to peer communications device determines whether the power control is to be implemented (i) for an initial uplink time slot, e.g., start or restart uplink time slot, or (ii) for a follow-on uplink time slot, e.g., a second uplink time slot since start or since a re-initialization operation with respect to the first transmission power control function operations. If it is determined that the power control is for an initial uplink time slot, then operation proceeds from sub-step 426 to sub-step 428, where the peer to peer communications device determines transmission power control independently of past uplink time slots. However, if it is determined that the power control is for a follow-on uplink time slot, then operation proceeds from sub-step 426 to sub-step 430. In sub-step 430, the peer to peer communications device uses a value used to control transmission power in an immediately preceding uplink time slot which preceded this follow-on time slot, e.g., a second uplink time slot since start or re-initialization of power control operations with regard to the first function, in implementing the power control function. In some embodiments, the immediately preceding uplink time slot and the follow-on time slot, e.g., the second uplink time slot, are separated by a downlink time slot. Operation proceeds from sub-step 428 or sub-step 430 to sub-step 432.

In sub-step 432, the peer to peer communications device generates a first value from a signal received from a WAN base station. In some embodiments, the step of implementing the first transmission power control function includes using the generated first value to control transmission power during an uplink mode of operation. Operation proceeds from sub-step 432 to sub-step 434. In sub-step 434 the peer to peer communications device determines a first maximum permitted transmission power level. Operation proceeds from sub-step 434 to sub-step 436. In sub-step 436, the peer to peer communications device determines a first transmission power level, e.g., an actual transmission power level to be used during an uplink time slot of the WAN system for peer to peer signaling. In some embodiments, the first function uses a first maximum permitted transmission power level, e.g., a determined value from sub-step 434, to determine the transmission power level to be used during an uplink share mode. Operation proceeds from sub-step 424 to sub-step 438. In sub-step 438 the peer to peer communications device transmits a peer to peer signal during the uplink share mode of operation using a transmission power level determined according to the first transmission power control function into the wide area network uplink communications band. Operation proceeds from step 424 via connecting node C 440 to step 410 to control switching between uplink and downlink share modes of operation.

Returning to sub-step 418 operation proceeds from sub-step 418 via connecting node B 422 to step 442. In step 442, the peer to peer communications device implements a second transmission power control function, which is different from the first transmission power control function. Step 442 includes sub-steps 444, 446, 448, 450, 452 and 454. In sub-step 444 the peer to peer communications device determines whether the power control is to be implemented (i) for an initial downlink time slot, e.g., a start or restart downlink time slot, or (ii) for a follow-on downlink time slot, e.g., a second downlink time slot since start or since a re-initialization operation with respect to the second transmission power control function operations. If it is determined that the power control is for an initial downlink time slot, then operation proceeds from sub-step 444 to sub-step 446, where the peer to peer communications device determines transmission power control independently of past downlink time slots. However, if it is determined that the power control is for a follow-on downlink time slot, then operation proceeds from sub-step 444 to sub-step 448. In sub-step 448, the peer to peer communications device uses a value used to control transmission power in an immediately preceding downlink time slot which preceded this follow-on time slot, e.g., a second downlink time slot since start or re-initialization of power control operations with regard to the second function, in implementing the power control function. In some embodiments, the immediately preceding downlink time slot and the follow-on downlink time slot, e.g., the second DL time slot, are separated by an uplink time slot. Operation proceeds from sub-step 446 or sub-step 448 to sub-step 450.

In sub-step 450, the peer to peer communications device generates a second value from a signal received from a WAN wireless terminal. Operation proceeds from sub-step 450 to sub-step 452. In sub-step 452 the peer to peer communications device determines a second maximum permitted transmission power level. Operation proceeds from sub-step 452 to sub-step 454. In sub-step 454, the peer to peer communications device determines a second transmission power level, e.g., an actual transmission power level to be used during a downlink time slot of the WAN system for peer to peer signaling. In some embodiments, the second function uses a second maximum permitted transmission power level, e.g., a determined value from sub-step 452, to determine the transmission power level to be used during a downlink share mode. Operation proceeds from step 442 to step 456. In step 456 the peer to peer communications device transmits a peer to peer signal during the downlink share mode of operation using a transmission power level determined according to the second transmission power control function into the wide area network downlink communications band. Operation proceeds from step 456 via connecting node C 440 to step 410 to control switching between uplink and downlink share modes of operation.

Figures 5, 5A, 5B:
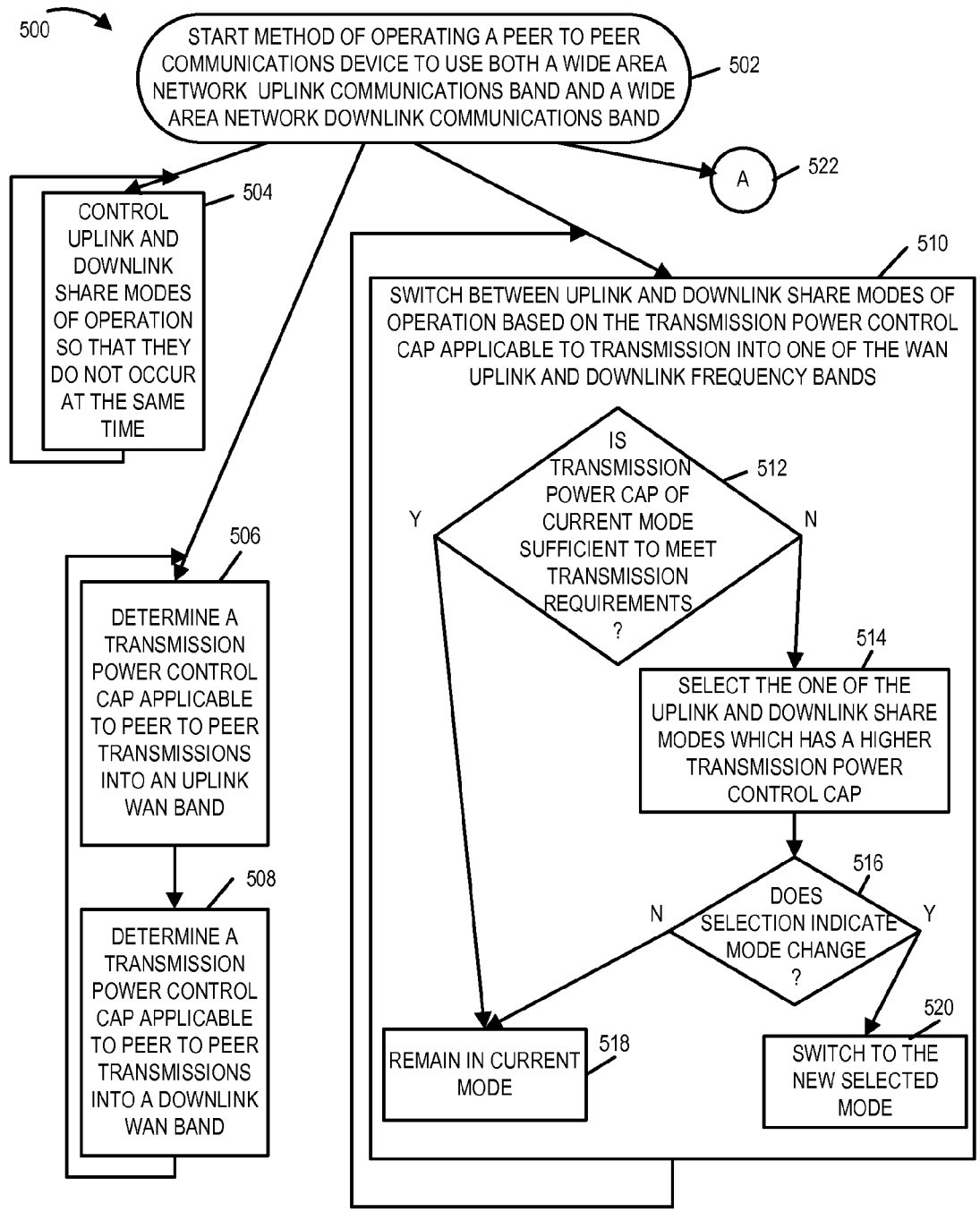
FIG. 5 comprising the combination of FIG. 5A
FIG. 5B is a flowchart of an exemplary method of operating a peer to peer communications device to use both a wide area network uplink communications band and a wide area network downlink communications band for peer to peer signaling in accordance with various embodiments.
Figure 5B:
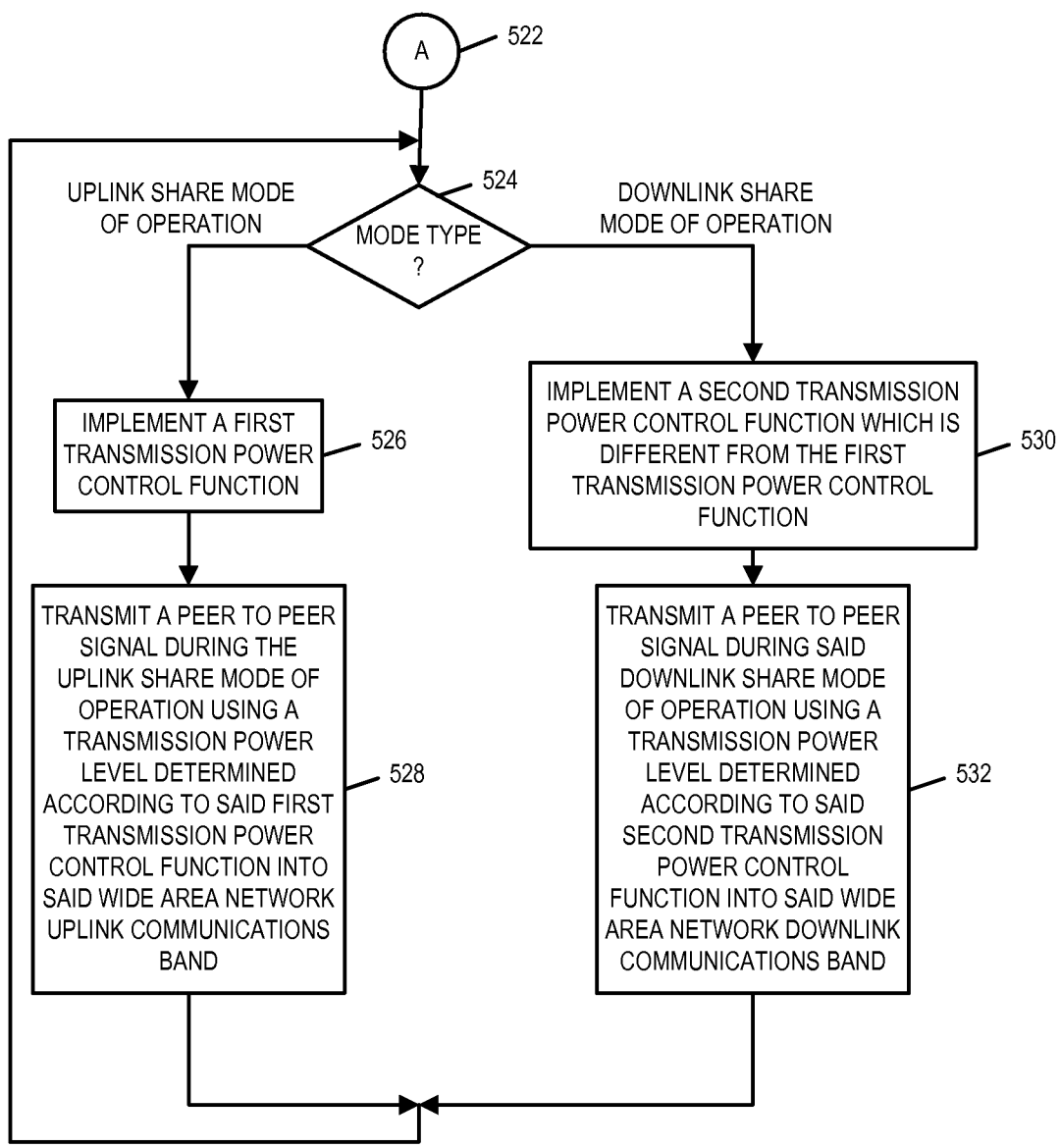

FIG. 5 comprising the combination of FIG. 5A and FIG. 5B is a flowchart 500 of an exemplary method of operating a peer to peer communications device to use both a wide area network uplink communications band and a wide area network downlink communications band for peer to peer signaling in accordance with various embodiments. In various embodiments, the wide area network is a FDD wide area network and the uplink communications band is a different frequency band from the downlink frequency band. Operation starts in step 502 where the peer to peer communications device is powered on and initialized and proceeds to steps 504, 506, 510, and step 524 via connecting node A 522.

Returning to step 504, in step 504, which is performed on an ongoing basis, the communications device controls uplink and downlink share modes of operation so that they do not occur at the same time. Returning to step 506, in step 506, the communications device determines a transmission power control cap applicable to peer to peer transmissions into an uplink wide area network band. Operation proceeds form step 506 to step 508, in which the communications device determines a transmission power control cap applicable to peer to peer transmission into a downlink wide area network band. Operation proceeds from step 508 back to step 506.

Returning to step 510, in step 510 which is performed on an ongoing basis, the communications device switches between uplink and downlink share modes of operation based on the transmission power control cap applicable to transmission into one of the WAN uplink and downlink frequency bands. Step 510 includes sub-steps 512, 514, 516, 518 and 520. In sub-step 512, the communications device determines if the transmission power cap of the current mode is sufficient to meet transmission requirements. If the peer to peer transmission power cap of the current mode of operation is sufficient to meet transmission requirements, then operation proceeds form step 512 to step 518. However, if the transmission power cap of the current mode is insufficient to meet current peer to peer transmission requirements, then operation proceeds from sub-step 512 to sub-step 514. In sub-step 514, the communications device selects the one of the uplink and downlink share modes which has a higher transmission power cap. Then, in sub-step 516, the communications device checks as to whether the selection of sub-step 514 indicates that a mode change should be performed. If the selection does not indicate that a mode change is to be performed, operation proceeds form sub-step 516 to sub-step 518, where the communications device is operated to remain in the current mode. However, if the selection of sub-step 514 indicates that a mode change is to be performed, then operation proceeds from sub-step 516 to sub-step 520, where the communications device switches to the new selected mode.

Returning to step 524, in step 524 the communications device proceeds to different steps as a function of the implemented mode. If the mode type is an uplink share mode of operation, operation proceeds from step 524 to step 526; however, if the mode type is a downlink share mode of operation, operation proceeds from step 524 to step 530.

Returning to step 526, in step 526 the peer to peer communications device implements a first transmission power control function. Operation proceeds from step 526 to step 528. In step 528, the peer to peer communications device transmits a peer to peer signal during the uplink share mode of operation using a transmission power level determined according to the first transmission power control function into the wide area network uplink communications band.

Returning to step 530, in step 530, the peer to peer communications device implements a second transmission power control function which is different from the first transmission power control function. Operation proceeds from step 530 to step 532. In step 532, the peer to peer communications device transmits a peer to peer signal during a downlink share mode of operation using a transmission power level determined according to a second transmission power control function into said wide area network downlink communications band. Operation proceeds from step 528 or step 532 to step 524, where flow is determined as a function of mode.

Figure 6:
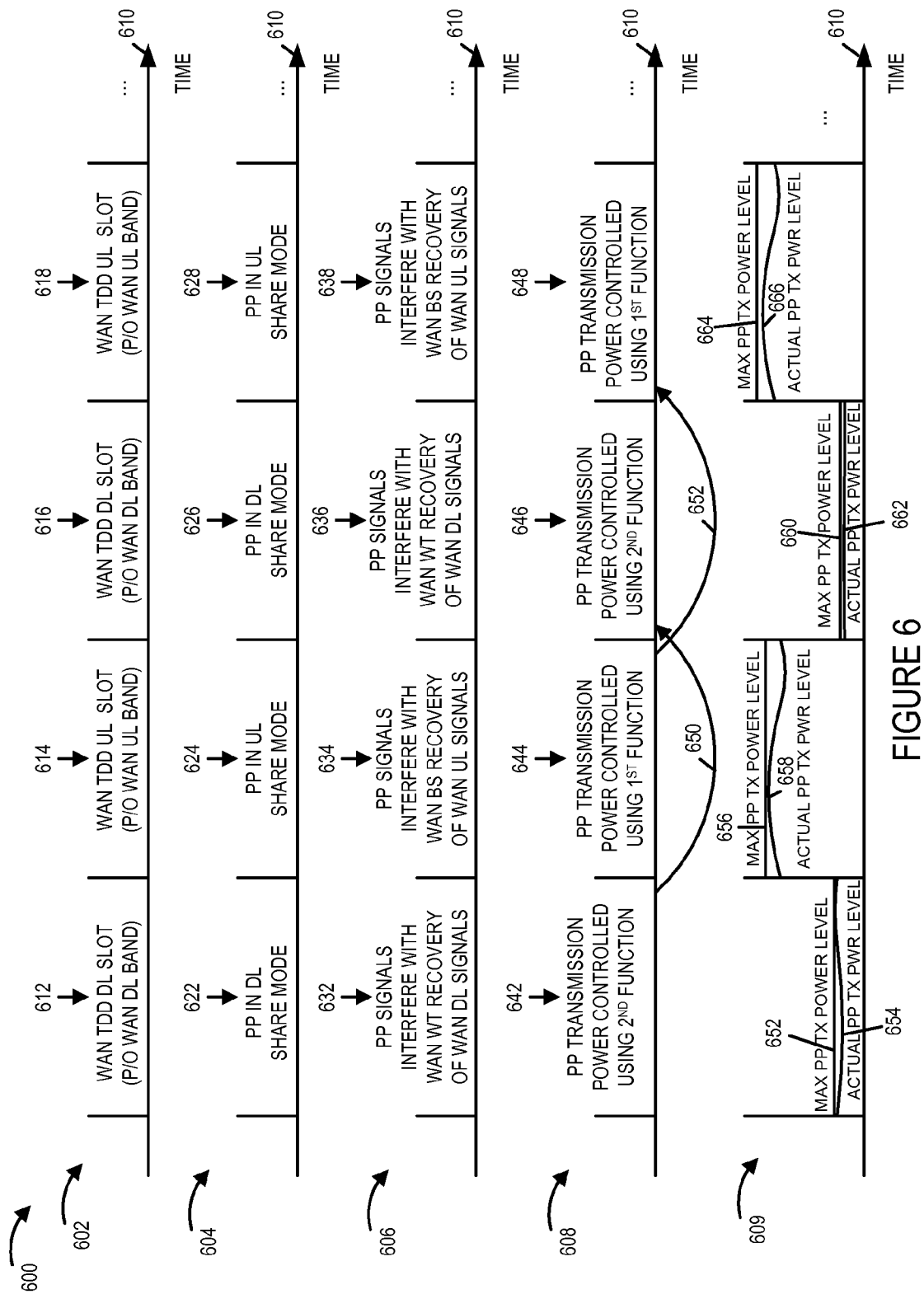
FIG. 6 is a drawing illustrating various features in an exemplary embodiment in which an exemplary peer to peer wireless terminal shares bandwidth with a wide area network (WAN) time division duplex (TDD) system.

FIG. 6 is a drawing 600 illustrating various features in an exemplary embodiment in which an exemplary peer to peer wireless terminal shares bandwidth with a wide area network (WAN) time division duplex (TDD) system. Drawing 602 plots WAN time slots along time axis 610. The illustrated sequence of time slots includes WAN TDD downlink slot 612, followed by WAN TDD uplink slot 614, followed by WAN TDD downlink slot 616, followed by WAN TDD uplink time slot 618. WAN TDD DL slots (612, 616) are part of a WAN DL communications band, while WAN TDD UP slots (614, 618) are part of a WAN UL communications band. In this exemplary embodiment the same set of frequencies, e.g., same set of OFDM tones, are used for WAN uplink and WAN downlink.

Drawing 604 plots the peer to peer share mode of the exemplary peer to peer wireless terminal vs time 610. Corresponding to WAN DL time slots (612, 616) the peer to peer device is in a DL share mode as indicated in slots (622, 626). Corresponding to WAN UL time slots (614, 618) the peer to peer device is in an UL share mode as indicated in slots (624, 628).

Drawing 606 identifies which signals the peer to peer signals interfere with during the different time slots over time 610. Corresponding to WAN DL time slots (612, 616) the peer to peer device interferes with WAN wireless terminal recovery of WAN downlink signals from a base station as indicated in slots (632, 636). Corresponding to WAN UL times slots (614, 618) the peer to peer device interferes with WAN base station recovery of WAN uplink signals from WAN wireless terminals as indicated in slots (634, 638).

Drawing 608 illustrates that the peer to peer wireless terminal uses different peer to peer power control functions during different times over time 610. Corresponding to WAN DL time slots (612, 616) the peer to peer device's transmission power is controlled using a $2^{nd}$ function as indicated in slots (642, 646). Corresponding to WAN UL time slots (614, 618) the peer to peer device's transmission power is controlled using a $1^{st}$ function as indicated in slots (644, 648). The second function is different from the first function. For example, the $2^{nd}$ function uses as one input a power measurement of a received uplink signal received from a WAN WT during a previous WAN UL time slot, while the $1^{st}$ function uses as one input a power measurement of a received downlink signal received from a WAN base station during a previous WAN DL time slot. Arrow 650 indicates that the peer to peer transmission power control of slot 646 uses a stored value obtained from the power control of slot 642. Arrow 652 indicates that the peer to peer transmission power control of slot 648 uses a stored value obtained from the power control of slot 644.

Drawing 609 plots peer to peer transmission power levels vs time 610. Corresponding to WAN DL time slot 612 the peer to peer device determines a maximum peer to peer transmission power level indicated by line 652 and an actual peer to peer transmission power level indicated by line 654. Corresponding to WAN UL time slot 614 the peer to peer device determines a maximum peer to peer transmission power level indicated by line 656 and an actual peer to peer transmission power level indicated by line 658. Corresponding to WAN DL time slot 616 the peer to peer device determines a maximum peer to peer transmission power level indicated by line 660 and an actual peer to peer transmission power level indicated by line 662. Corresponding to WAN UL time slot 618 the peer to peer device determines a maximum peer to peer transmission power level indicated by line 664 and an actual peer to peer transmission power level indicated by line 666. Note that discontinuities in power levels, in this example, are observed at the boundaries; however the peer to peer wireless terminal can continue peer to peer communications during both WAN TDD downlink and uplink time slots.

Figure 7:
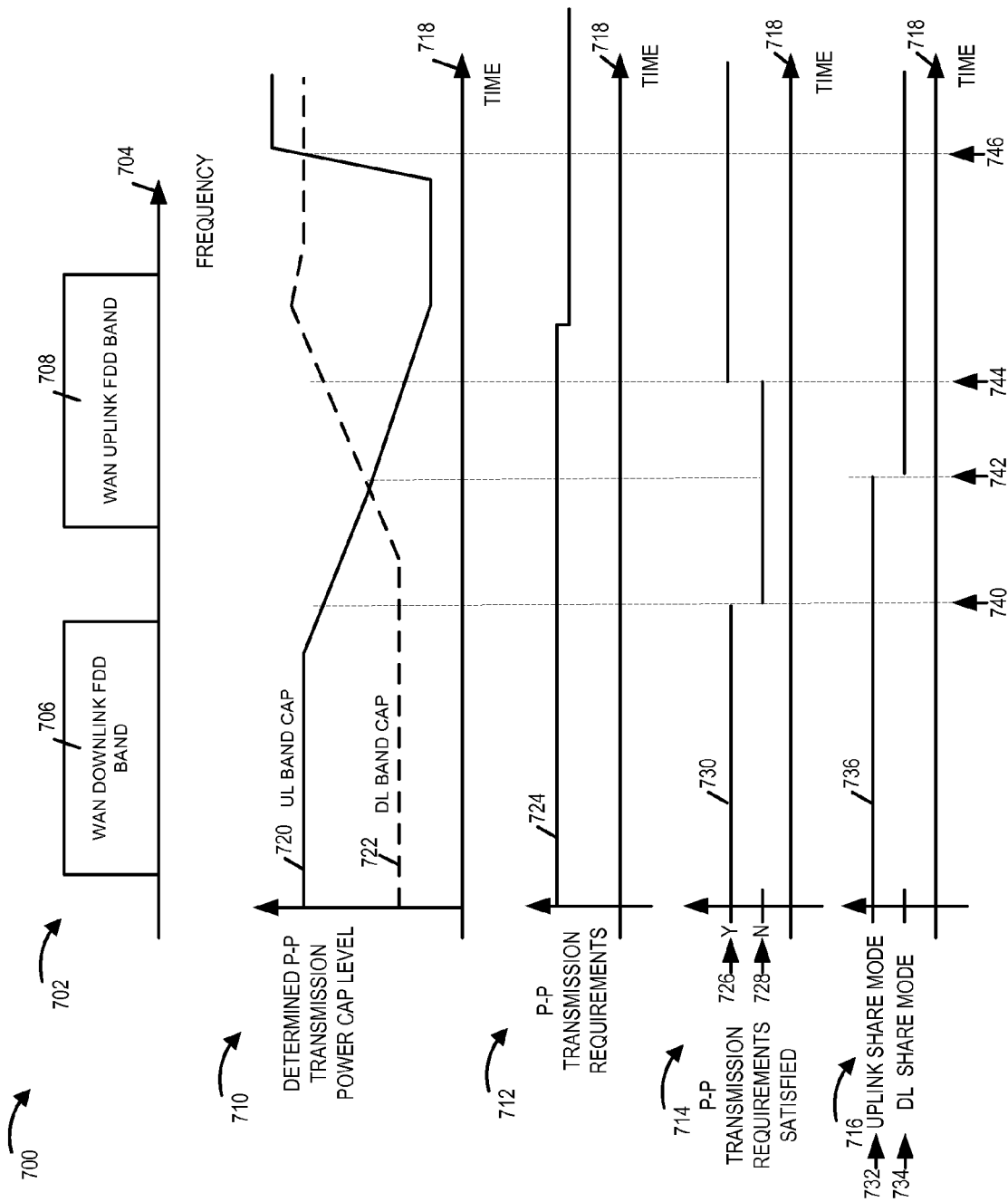
FIG. 7 is a drawing illustrating various features in an exemplary embodiment in which an exemplary peer to peer wireless terminal shares bandwidth with a wide area network (WAN) frequency division duplex (TDD) system.

FIG. 7 is a drawing 700 illustrating various features in an exemplary embodiment in which an exemplary peer to peer wireless terminal shares bandwidth with a wide area network (WAN) frequency division duplex (TDD) system. Drawing 702 illustrates an exemplary WAN downlink FDD band 706 and an exemplary WAN uplink FDD band 708 plotted along frequency axis 704.

Drawing 710 illustrates exemplary determined peer to peer transmission power cap levels vs time 718. Solid line 720 represents an exemplary peer to peer uplink band cap while dashed line 722 represents an exemplary peer to peer downlink band cap.

Drawing 712 plots exemplary peer to peer transmission requirements as indicated by line 724 vs time 718. Drawing 714 plots an indication as to whether the peer to peer transmission requirements are being satisfied vs time 718. If line 730 is at level 726 the requirements are being satisfied, while if line 730 is at level 728 the requirements are not being satisfied.

Drawing 716 illustrates the mode of operation of the peer to peer wireless terminal vs time 718. If line 736 is at level 732 then the peer to peer communications device is in uplink share mode, while if line 736 is at level 734 then the peer to peer communications device is in downlink share mode.

At time point 740, the peer to peer transmission requirements are no longer satisfied. Note that the peer to peer wireless terminal has been in uplink share mode prior to time point 740 and that the UL band cap 720 has been dropping off prior to time point 740.

Since the peer to peer transmission requirements are no longer being satisfied, the peer to peer communications device compares the uplink and downlink band caps and uses the mode corresponding to the higher of the two levels. At time point 742, the DL band cap 722 exceeds the uplink band cap 720, so the peer to peer communications device switches to downlink share mode.

Between time point 742 and time point 744 the peer to peer transmission power requirements 730 are not satisfied so the peer to peer wireless terminal continues to compare UL and DL determined caps; however, the DL cap 722 remains higher than the UL cap 720, so the peer to peer wireless terminal remains in downlink share mode 734.

At time 744 the peer to peer wireless terminal's transmission requirements 730 are satisfied and remain satisfied for the duration of the illustrated example. At time 746, the UL band cap 720 exceeds the DL band cap 722; however, since the peer to peer transmission requirements are still being satisfied 726 no switch occurs and the peer to peer wireless terminal remains in the downlink share mode.

While described in the context of an OFDM system, the methods and apparatus of various embodiments are applicable to a wide range of communications systems including many non-OFDM and/or non-cellular systems. Some exemplary systems include a mixture of technologies utilized in the peer to peer signaling, e.g., some OFDM type signals and some CDMA type signals.

In various embodiments nodes described herein are implemented using one or more modules to perform the steps corresponding to one or more methods, for example, implementing a first transmission power control function, implementing a second transmission power control function, transmitting a peer to peer signal during an uplink share mode of operation, transmitting a peer to peer signal during a downlink share mode of operation, controlling switching between uplink and downlink share mode of operation, comparing transmission control caps, etc. In some embodiments various features are implemented using modules. Such modules may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium including machine executable instructions for causing a machine, e.g., processor and associated hardware, to perform one or more of the steps of the above-described method(s).

Numerous additional variations on the methods and apparatus described above will be apparent to those skilled in the art in view of the above descriptions. Such variations are to be considered within scope. The methods and apparatus of various embodiments may be, and in various embodiments are, used with CDMA, orthogonal frequency division multiplexing (OFDM), and/or various other types of communications techniques which may be used to provide wireless communications links between access nodes and mobile nodes. In some embodiments the access nodes are implemented as base stations which establish communications links with mobile nodes using OFDM and/or CDMA. In various embodiments the mobile nodes are implemented as notebook computers, personal data assistants (PDAs), or other portable devices including receiver/transmitter circuits and logic and/or routines, for implementing the methods of various embodiments.

What is claimed is:

1. A method of operating a peer to peer communications device to use both a wide area network uplink communications band and a wide area network down link communications band, the method comprising:
    during an uplink share mode of operation, during which said wide area network uplink communications band is used for peer to peer communications between peer to peer communications devices, implementing a first transmission power control function used to control the transmission power of peer to peer signals transmitted by said peer to peer communications device; and
    during a downlink share mode of operation, during which said wide area network downlink communications band is used for peer to peer communications between peer to peer communications devices, implementing a second transmission power control function used to control the transmission power of peer to peer signals transmitted by said peer to peer communications device, said second transmission power control function being different from said first transmission power control function, said second power control function using a lower maximum transmission power level than said first transmission power control function.

2. The method of claim 1, wherein during said uplink share mode of operation and said downlink share mode of operation said peer to peer communications device shares air link resources used for communicating between peer to peer devices with wide area network devices, the method further comprising:
    transmitting, into said wide area network uplink communications band, a peer to peer signal between peer to peer devices, during said uplink share mode of operation using a transmission power level determined according to said first transmission power control function; and
    transmitting, into said wide area network downlink communications band, a peer to peer signal between peer to peer devices, during said downlink share mode of operation using a transmission power level determined according to said second transmission power control function.

3. The method of claim 2,
    wherein said wide area network is a TDD wide area network;
    wherein said wide area network uplink communications band which is used for communicating between peer to peer devices includes an uplink time slot of said TDD wide area network which is shared by both peer to peer devices and wide area network devices; and
    wherein said wide area network downlink communications band which is used for communicating between peer to peer devices includes a downlink time slot of said TDD wide area network which is shared by both peer to peer devices and wide area network devices.

4. The method of claim 3, further comprising:
controlling switching between said uplink and downlink share modes of operation according to a time division multiplexing schedule used by said wide area network.

5. The method of claim 4, further comprising:
storing a first set of power control information used by said first power control function; and
storing a second set of power control information used by said second power control function.

6. The method of claim 5, wherein controlling switching includes controlling switching between using the first and second stored sets of power control information depending on the mode of operation.

7. The method of claim 6, wherein implementing said first transmission power control function includes implementing said first transmission power control function during a second uplink time slot using a value used to control transmission power in an immediately preceding uplink time slot which precedes said second uplink time slot.

8. The method of claim 7, wherein implementing said second transmission power control function includes implementing said second power control function during a second downlink time slot using a value used to control transmission power in an immediately preceding downlink time slot which precedes said second downlink time slot.

9. The method of claim 8, wherein said immediately preceding uplink time slot and said second uplink time slot are separated by a downlink time slot.

10. The method of claim 4, wherein implementing said first transmission power control function includes generating a first value from a signal received from a WAN base station; and
using said value to control transmission power during said uplink mode of operation.

11. The method of claim 4, wherein implementing said second transmission power control function includes generating a second value from a signal received from a WAN wireless terminal.

12. The method of claim 4 wherein said first transmission power control function uses a first maximum transmission power level and said second transmission power control function uses a second maximum permitted transmission power level to determine the transmission power level to be used during said uplink and downlink shared modes respectively.

13. The method of claim 12, wherein performing said first transmission power control function includes determining from a received signal the first maximum transmission power level; and
wherein performing said second transmission power control function includes determining from a second received signal the second maximum transmission power level.

14. The method of claim 2,
wherein said wide area network is a FDD wide area network; and
wherein said wide area network uplink communications band is a different frequency band from said wide area network downlink frequency band.

15. The method of claim 14, further comprising:
controlling uplink and downlink share modes of operation so that they do not occur at the same time.

16. The method of claim 15, further comprising:
switching between uplink and downlink share modes of operation based on a transmission power control cap applicable to transmissions into one of said wide area network uplink and downlink frequency bands.

17. The method of claim 16, wherein said switching is to the one of the uplink and downlink share modes which has a higher transmission power control cap when the transmission power control cap of the current mode of operation is insufficient to meet transmission requirements.

18. A wireless terminal that supports use of both a wide area network uplink communications band and a wide area network downlink communications band, the wireless terminal comprising:
an uplink share mode power control module for implementing a first transmission power control function used to control the transmission power of peer to peer signals transmitted by said wireless terminal during an uplink share mode of operation during which said wide area network uplink communications band is used for peer to peer communications between peer to peer communications devices; and
a downlink share mode power control module for implementing a second transmission power control function during a downlink share mode of operation during which said wide area network downlink communications band is used for peer to peer communications between peer to peer communications devices, said second transmission power control function being used to control the transmission power of peer to peer signals transmitted by said wireless terminal, said second transmission power control function being different from said first transmission power control function, said second power control function using a lower maximum transmission power level than said first transmission power control function.

19. The wireless terminal of claim 18, wherein during said uplink share mode of operation and said downlink share mode of operation said wireless terminal shares air link resources used for communicating between peer to peer devices with wide area network devices, the wireless terminal further comprising:
a transmitter responsive to said uplink share mode power control module during said uplink share mode of operation and responsive to said downlink share power control module during said downlink share mode of operation, said transmitter transmitting, into said wide area network uplink communications band, a peer to peer signal between peer to peer devices, during said uplink share mode of operation using a transmission power level determined according to said first transmission power control function and transmitting, into said wide area network downlink communications band, a peer to peer signal between peer to peer devices, during said downlink share mode of operation using a transmission power level determined according to said second transmission power control function.

20. The wireless terminal of claim 19,
wherein said wide area network is a TDD wide area network;
wherein said wide area network uplink communications band which is used for communicating between peer to peer devices includes an uplink time slot of said TDD wide area network; and
wherein said wide area network downlink communications band which is used for communicating between peer to peer devices includes a downlink time slot of said TDD wide area network.

21. The wireless terminal of claim 20, further comprising:
a mode control module for controlling switching between said uplink and downlink share modes of operation according to a time division multiplexing schedule used by said wide area network.

22. The wireless terminal of claim 21, further comprising:
memory including a first stored set of power control information used by said first power control function and a second stored set of power control information used by said second power control function, the first and second stored sets of power control information including at least some information which is different.

23. The wireless terminal of claim 22, wherein said mode control module controls switching between use of the first and second stored sets of power control information depending on the mode of operation.

24. The wireless terminal of claim 23, wherein said first stored set of power control information includes a value used to control transmission power in an immediately preceding uplink time slot which precedes a second uplink time slot; and
wherein the uplink share mode power control module implants the first transmission power control function during the second uplink time slot using a value used to control transmission power in an immediately preceding uplink time slot which precedes said second uplink time slot.

25. The wireless terminal of claim 24, wherein the downlink share mode power control module implements the second transmission power control function during a second downlink time slot using a value used to control transmission power in an immediately preceding downlink time slot which precedes said second downlink time slot.

26. The wireless terminal of claim 25, wherein said immediately preceding uplink time slot and said second uplink time slot are separated by a downlink time slot.

27. The wireless terminal of claim 21, further comprising:
a receiver for a signal from a wide area network base station; and
wherein the uplink share mode power control module implements the first transmission power control function by i) generating a first value from a signal received from a WAN base station; and ii) using said value to control transmission power during said uplink mode of operation.

28. The wireless terminal of claim 21, wherein the downlink share mode power control module implements the second transmission power control function using a second value generated from a signal received from a WAN wireless terminal.

29. The wireless terminal of claim 21 wherein said first function uses a first maximum transmission power level and said second function uses a second maximum permitted transmission power level to determine the transmission power level to be used during said uplink and downlink shared modes respectively.

30. The wireless terminal of claim 29, wherein the uplink share mode power control module includes a first received power level determination module for determining from a received signal the first maximum transmitted power level; and
wherein the downlink share mode power control module includes a second received power level determination module for determining from a second received signal the second maximum transmission power level.

31. The wireless terminal of claim 18,
wherein said wide area network is a FDD wide area network; and
wherein said wide area network uplink communications band is a different frequency band from said downlink frequency band.

32. The wireless terminal of claim 31, further comprising:
stored transmission power control cap information; and
a mode control module for controlling switching between said uplink and downlink share modes of operation; and
wherein said mode control modules controls switching between uplink and downlink share modes of operation based on a transmission power control cap applicable to transmissions into one of said WAN uplink and downlink frequency bands.

33. The wireless terminal of claim 32, further comprising:
a transmission power control cap comparison module for determining if a transmission power control cap of a current mode of operation is less than a current transmission power requirement; and
wherein said mode control module controls switching to the one of the uplink and downlink share modes which has a higher transmission power control cap when the transmission power control cap of the current mode of operation is insufficient to meet transmission requirements.

34. A wireless terminal that supports use of both a wide area network uplink communications band and a wide area network down link communications band, the wireless terminal comprising:
uplink share mode power control means for implementing a first transmission power control function used to control the transmission power of peer to peer signals transmitted by said wireless terminal during an uplink share mode of operation during which said wide area network uplink communications band is used for peer to peer communications between peer to peer communications devices; and
means for implementing a second transmission power control function during a downlink share mode of operation during which said wide area network downlink communications band is used for peer to peer communications between peer to peer communications devices, said second transmission power control function being used to control the transmission power of peer to peer signals transmitted by said wireless terminal, said second transmission power control function being different from said first transmission power control function, said second power control function using a lower maximum transmission power level than said first transmission power control function.

35. The wireless terminal of claim 34, wherein during said uplink share mode of operation and said downlink share mode of operation said wireless terminal shares air link resources used for communicating between peer to peer devices with wide area network devices, the wireless terminal further comprising:
transmitter means responsive to said uplink share mode power control means during said uplink share mode of operation and responsive to said means for implementing a second transmission power control function during said downlink share mode of operation, said transmitter means transmitting a peer to peer signal between peer to peer devices into said wide area network uplink communications band during said uplink share mode of operation using a transmission power level determined according to said first transmission power control function and transmitting a peer to peer signal between peer to peer devices into said wide area network downlink communications band during said downlink share mode of operation using a transmission power level determined according to said second transmission power control function.

36. The wireless terminal of claim 35,
wherein said wide area network is a TDD wide area network;
wherein said wide area network uplink communications band which is used for communicating between peer to peer devices includes an uplink time slot of said TDD wide area network; and
wherein said wide area network downlink communications band which is used for communicating between peer to peer devices includes a downlink time slot of said TDD wide area network.

37. The wireless terminal of claim 36, further comprising:
means for controlling switching between said uplink and downlink share modes of operation according to a time division multiplexing schedule used by said wide area network.

38. The wireless terminal of claim 35,
wherein said wide area network is a FDD wide area network; and
wherein said wide area network uplink communications band is a different frequency band from said downlink frequency band.

39. A non-transitory computer readable medium embodying machine executable instructions for controlling a peer to peer communications device to implement a method of communicating with another communications device, the method comprising:
during an uplink share mode of operation, during which said wide area network uplink communications band is used for peer to peer communications between peer to peer communications devices, implementing a first transmission power control function used to control the transmission power of peer to peer signals transmitted by said peer to peer communications device; and
during a downlink share mode of operation, during which said wide area network downlink communications band is used for peer to peer communications between peer to peer communications devices, implementing a second transmission power control function used to control the transmission power of peer to peer signals transmitted by said peer to peer communications device, said second transmission power control function being different from said first transmission power control function, said second power control function using a lower maximum transmission power level than said first transmission power control function.

40. The non-transitory computer readable medium of claim 39, wherein during said uplink share mode of operation and said downlink share mode of operation said peer to peer communications device shares air link resources with wide area network devices, the non-transitory computer readable medium further embodying machine executable instructions for:
transmitting, into said wide area network uplink communications band, a peer to peer signal between peer to peer devices, during said uplink share mode of operation using a transmission power level determined according to said first transmission power control function; and
transmitting, into said wide area network downlink communications band, a peer to peer signal between peer to peer devices, during said downlink share mode of operation using a transmission power level determined according to said second transmission power control function.

41. The non-transitory computer readable medium of claim 40,
wherein said wide area network is a TDD wide area network;
wherein said wide area network uplink communications band which is used for communicating between peer to peer devices includes an uplink time slot of said TDD wide area network; and
wherein said wide area network downlink communications band which is used for communicating between peer to peer devices includes a downlink time slot of said TDD wide area network.

42. The non-transitory computer readable medium of claim 41, further embodying machine executable instructions for:
controlling switching between said uplink and downlink share modes of operation according to a time division multiplexing schedule used by said wide area network.

43. The non-transitory computer readable medium of claim 40,
wherein said wide area network is a FDD wide area network; and
wherein said wide area network uplink communications band is a different frequency band from said downlink frequency band.

44. An apparatus comprising:
a processor configured to:
implement, during an uplink share mode of operation, during which said wide area network uplink communications band is used for peer to peer communications between peer to peer communications devices, a first transmission power control function used to control the transmission power of peer to peer signals transmitted by said apparatus; and
implement, during a downlink share mode of operation, during which said wide area network downlink communications band is used for peer to peer communications between peer to peer communications devices, a second transmission power control function used to control the transmission power of peer to peer signals transmitted by said peer to peer communications device, said second transmission power control function being different from said first transmission power control function, said second power control function using a lower maximum transmission power level than said first transmission power control function.

45. The apparatus of claim 44, wherein during said uplink share mode of operation and said downlink share mode of operation said apparatus shares air link resources used for communicating between peer to peer devices with wide area network devices; and
wherein said processor is further configured to:
control the transmission, into said wide area network uplink communications band, of a peer to peer signal between peer to peer devices, during said uplink share mode of operation using a transmission power level determined according to said first transmission power control function; and
control the transmission, into said wide area network downlink communications band, of a peer to peer signal between peer to peer devices, during said downlink share mode of operation using a transmission power level determined according to said second transmission power control function.

46. The apparatus of claim 45,
wherein said wide area network is a TDD wide area network;

wherein said wide area network uplink communications band which is used for communicating between peer to peer devices includes an uplink time slot of said TDD wide area network; and wherein said wide area network downlink communications band which is used for communicating between peer to peer devices includes a downlink time slot of said TDD wide area network.

47. The apparatus of claim 46, wherein said processor is further configured to:

control switching between said uplink and downlink share modes of operation according to a time division multiplexing schedule used by said wide area network.

48. The apparatus of claim 45, wherein said wide area network is a FDD wide area network; and wherein said wide area network uplink communications band is a different frequency band from said downlink frequency band.

49. The method of claim 1, wherein said peer to peer communications device operates in said downlink share mode of operation while said wide area network downlink communications band is used by an access node to transmit signals to mobile nodes.

50. The method of claim 49, wherein said peer to peer communications device operates in said uplink share mode of operation while said wide area network uplink communications band is used by the access node to receive signals from mobile nodes.

51. The method of claim 1, wherein implementing a second transmission power control function used to control the transmission power of peer to peer signals transmitted by said peer to peer communications device includes controlling the transmission power of a peer to peer signal transmitted from said peer to peer communications device to another peer to peer communications device; and wherein said peer to peer communications device is within a cell corresponding to an access node which uses said wide area network uplink frequency band for receiving signals from mobile nodes and which uses said wide area network downlink frequency band for transmitting signals to mobile nodes.

* * * * *